United States Patent
Frickel et al.

(10) Patent No.: US 11,139,685 B2
(45) Date of Patent: Oct. 5, 2021

(54) METHOD OF DETERMINING INCREASE IN ENERGY AND PEAK DEMAND SAVINGS USING SERIES VOLTAGE REGULATING DEVICE THROUGH DIRECT VOLTAGE REDUCTION DIRECTLY AT POINT OF LOAD

(71) Applicant: Edge Electrons Limited, Hong Kong (HK)

(72) Inventors: Ben Frickel, Hong Kong (HK); Julie Ann Estolonio, Hong Kong (HK); Shaira Joyce Prado, Hong Kong (HK); Gaia Maria Javier, Hong Kong (HK); Jian Carlo Decena Zapata, Pampanga (PH); Gordon Currie, Makati (PH); Neal George Stewart, Makati (PH)

(73) Assignee: Edge Electrons Limited, Hong Kong (HK)

( * ) Notice: Subject to any disclaimer, the term of this patent is extended or adjusted under 35 U.S.C. 154(b) by 95 days.

(21) Appl. No.: 16/630,478

(22) PCT Filed: Jul. 12, 2018

(86) PCT No.: PCT/IB2018/055137
§ 371 (c)(1),
(2) Date: Jan. 13, 2020

(87) PCT Pub. No.: WO2019/012462
PCT Pub. Date: Jan. 17, 2019

(65) Prior Publication Data
US 2021/0119480 A1   Apr. 22, 2021

Related U.S. Application Data

(60) Provisional application No. 62/531,362, filed on Jul. 12, 2017.

(51) Int. Cl.
*H02J 13/00* (2006.01)
*G05B 13/04* (2006.01)

(52) U.S. Cl.
CPC ...... *H02J 13/00002* (2020.01); *G05B 13/048* (2013.01); *H02J 2203/20* (2020.01)

(58) Field of Classification Search
CPC ............ H02J 13/00002; H02J 2203/20; H02J 3/1814; G05B 13/048; Y02E 40/10; H02M 5/2932; H02M 5/293; H02M 3/1582
See application file for complete search history.

(56) References Cited

U.S. PATENT DOCUMENTS 9,819,185 B2 * 11/2017 Stewart ............... H02J 3/12
9,819,279 B2 * 11/2017 Stewart ............... G05F 1/44
(Continued)

*Primary Examiner* — Ramesh B Patel
(74) *Attorney, Agent, or Firm* — Idea Intellectual Limited; Margaret A. Burke; Sam T. Yip

(57) ABSTRACT

A method of determining one or more direct voltage reduction (DVR) factors at a point of load (POL) in a power grid voltage environment. An energy processing unit (EPU) is installed at each individual POL; each EPU includes at least one AC-AC series voltage regulator. An EPU-regulated output voltage is increased under specific controlled conditions. One or more independent DVR factors for each individual POL are determined during the increased and decreased EPU-regulated output voltage.

10 Claims, 5 Drawing Sheets

(56) References Cited

U.S. PATENT DOCUMENTS

| | | | |
|---|---|---|---|
| 9,979,312 B2* | 5/2018 | Stewart | H02J 3/12 |
| 10,230,242 B2* | 3/2019 | Stewart | H02J 3/387 |
| 2007/0052397 A1* | 3/2007 | Thompson | H02M 5/293 |
| | | | 323/223 |
| 2010/0301774 A1* | 12/2010 | Chemel | H05B 47/155 |
| | | | 315/297 |
| 2014/0268959 A1* | 9/2014 | Frohman | H02M 7/797 |
| | | | 363/98 |
| 2017/0063087 A1* | 3/2017 | Stewart | H02J 3/12 |
| 2017/0141692 A1* | 5/2017 | Stewart | H02M 5/293 |
| 2018/0375421 A1* | 12/2018 | Mauri | H02M 3/335 |
| 2019/0123643 A1* | 4/2019 | Nikitin | H02M 1/08 |
| 2020/0125127 A1* | 4/2020 | Zapata | H02H 3/023 |

* cited by examiner

METHOD OF DETERMINING INCREASE IN ENERGY AND PEAK DEMAND SAVINGS USING SERIES VOLTAGE REGULATING DEVICE THROUGH DIRECT VOLTAGE REDUCTION DIRECTLY AT POINT OF LOAD

FIELD OF THE INVENTION

The present invention relates to voltage regulation in general, and, more particularly, to wide-range AC-AC series voltage regulation units installed directly at points-of-load (POL) in an electrical network.

BACKGROUND

In the electricity generation and distribution industry, it is well known that a reduction in voltage on the utility distribution grid will have a corresponding reduction in energy (KWH), power (KW), and reactive power (KVAR), hence peak demand. It is known in the industry as conservation voltage reduction (CVR) and is a proven technology for reducing energy and peak demand. CVR is implemented upstream in the grid distribution system so the efficiency increase benefits are realized by consumers and the distributor. It has also been the legacy method used to reduce the grid peak demand to increase grid capacity.

This legacy CVR method is standard in the electrical industry and is clearly laid out in a range of electrical industry documents and patents, typical of which is published US patent 2014/0039712A1. In this published application, the distribution utility voltage is monitored and various mathematical methods are employed to calculate the CVR factor. However, the CVR factor can only be applied as an approximate average across the area of that particular distribution grid network. Not only is this CVR factor an average over a large number of mixed loads connected to that network, there is also no way to generate a meaningful, granular, controlled individual factor for each facility by facility at each point of load (POL) using any legacy utility CVR approach.

There is a need in the art for a new method and apparatus to approach voltage reduction at each POL.

SUMMARY OF THE INVENTION

The present invention uses a new, wide-range AC-AC series voltage regulation unit installed directly at each point-of-load (POL) that now allows a new era of increased voltage reduction, with granular, high-resolution, and high levels of voltage reduction at each POL. Accordingly, a new term is provided to differentiate this new method—DVR (direct voltage reduction, as compared to the legacy utility industry method—CVR (conservation voltage reduction)).

The invention provides a new AC-AC series voltage regulation unit, the energy processing unit (EPU), installed at the point-of-load, as clearly detailed in US Patent Application Publication No. 2017/0063087A1 (the disclosure of which is incorporated herein by reference in its entirety). By implementing the inventive EPU/electronic AC-AC series voltage regulation device, the energy, power, and peak demand savings is increased through direct voltage reduction (DVR) at each point of load (POL), compared to the general average CVR savings across a distribution network. Further, the present invention provides a new and innovative method with significantly increased accuracy to measure and directly confirm the energy, power, and peak demand savings of CVR through direct voltage reduction (DVR). Through use of the AC-AC series voltage regulation unit/EPU, the voltage reduction results in a corresponding increased energy (KWH), power (KW), and reactive power (KVAR), hence peak demand savings.

Also, through the use of these AC-AC voltage regulation units installed at each POL, a new method of variable duty cycle voltage modulation has been developed to derive a DVR factor. This new method uses the EPU at each POL to increase and decrease the EPU-regulated output voltage under specific controlled conditions, with monitoring and transmitting the resultant full-power quality data in real time at each voltage point to derive the individual DVRs at each POL to optimize the energy (KWH), power (KW), and reactive power (KVAR), hence peak demand savings.

DETAILED DESCRIPTION

Figure 1:
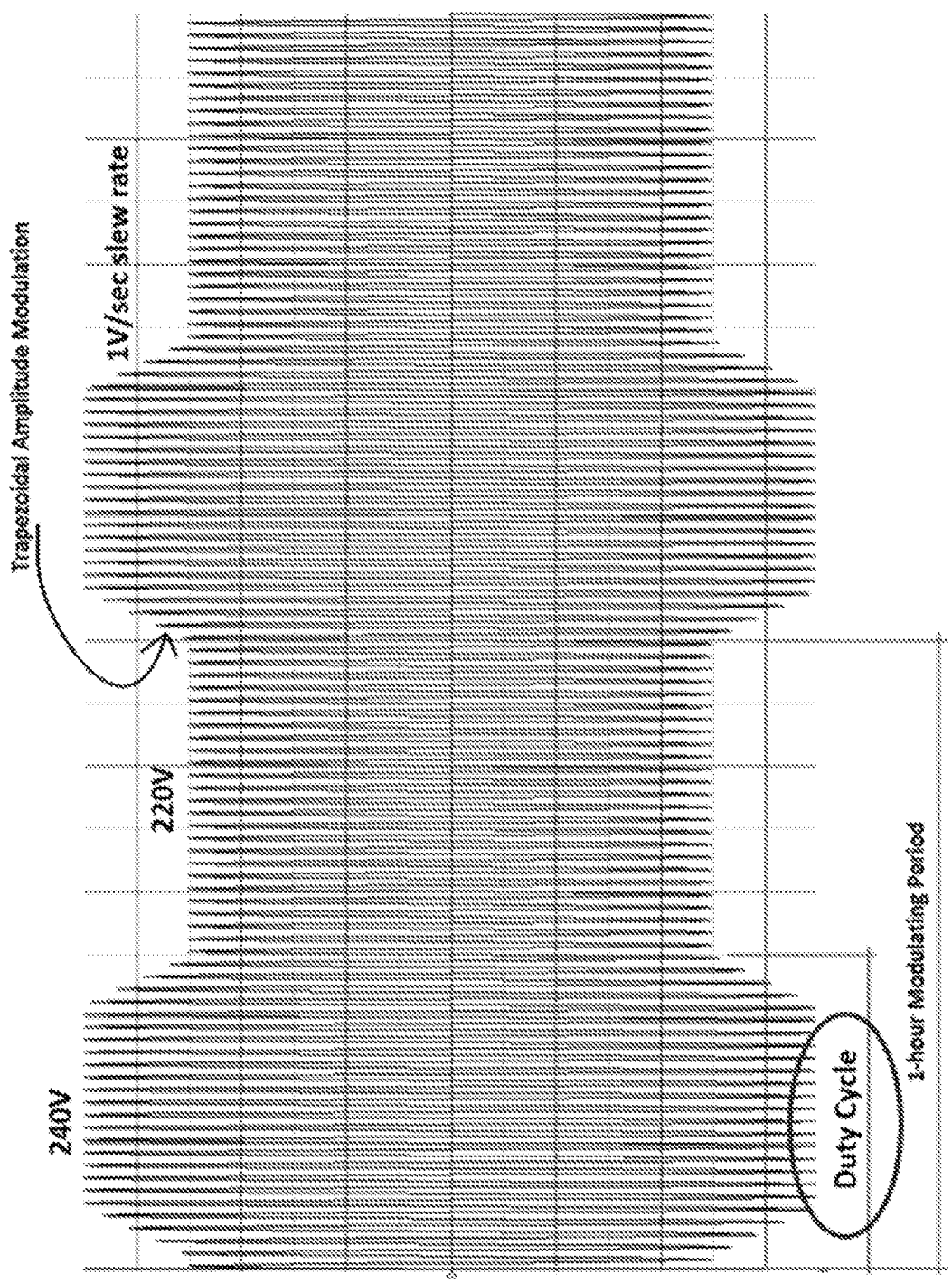
FIG. 1 depicts an example of a load POL voltage modulation as trapezoidal with 1 volt/second slew rate of increasing and decreasing ramp slopes with a 20 VAC voltage change applied in a variable duty cycle.

In the electrical industry, it is well known that a reduction in voltage on the utility distribution grid will have a corresponding reduction in energy (KWH), power (KW), and reactive power (KVAR), hence peak demand savings. This common technique is known in the industry as conservation voltage reduction (CVR) and is a well-proven technology for reducing energy and peak demand. CVR is implemented upstream in the grid distribution system so the efficiency increase benefits are realized by consumers and the distributor. CVR has been a legacy method used to reduce the grid peak demand to increase grid capacity.

The methods of the present disclosure use an EPU/AC-AC series voltage regulation unit, as disclosed in us patent application publication no. 2017/0063087A1 which is installed directly at each point-of-load (POL). Each EPU reports various operating conditions to a central controller. The central controller can communicate with each EPU to set a voltage level within each POL (for example, a house or apartment). The EPU also includes a bypass switch to allow the POL to operate at line voltage. Thus, if the EPU has been set to cause the POL to operate at 230V and the grid voltage is reduced to 225V in a CVR operation, the bypass switch would permit the POL to operate at the line voltage of 225V instead of the preset voltage of 230V. The use of the EPU permits a new era of granular, high resolution, full voltage reduction at each POL, hence a new term has to be used to differentiate this new method—DVR (direct voltage reduction), as distinguished from the legacy industry method—CVR (conservation voltage reduction).

The method of the present invention uses a remotely-controlled and monitored AC-AC series voltage regulator unit/energy processing unit (EPU), disclosed in U.S. Published Patent Application 2017/0063087 A1 the disclosure of which is incorporated by reference herein, that not only tightly regulates the output voltage of the EPU directly at each POL, but can change output voltage autonomously or remotely over the full wide range of voltages, and specifically be invisible to the consumer experience through careful modulation of the voltage change. The EPU monitors and transmits full power quality data to a remote monitoring and controlling location, so each EPU allows accurate voltage changes direct at each POL, in combination with full power quality data being monitored and transmitted, hence accurate energy (KWH), power (KW), and reactive power (KVAR), hence peak demand can be calculated in real time at each POL. Note that the remote monitoring and controlling location, with or without knowledge of the grid voltage, may remotely set the voltage level of the EPU. Hence, by this method of direct voltage reduction (DVR) at each individual POL, individual DVR factors can be calculated with very high resolution, even at different voltage levels, and also for different types of individual facilities and loads, and important and critical is invisible to the consumer experience of these changing voltages. The DVR value directly indicates the energy savings at each POL through the implementation of voltage reduction at the individual POL.

The EPU voltage regulation in accordance to the embodiments of the present invention is by series voltage regulation methods including, but not limited to, the series AC high frequency voltage regulator techniques disclosed in U.S. Provisional Utility Patent Application No. 61/913,935, U.S. Provisional Utility Patent Application No. 61/913,934, and U.S. Provisional Utility Patent Application No. 61/908,763, all of the disclosure of which are incorporated by reference herein. The series voltage regulation methods have major advantages over the shunt current regulation method. The shunt current regulation method requires significant current to be generated to change the voltage differential under the conditions where the AC line impedance is very low. The AC line impedance is typically much less than 1 ohm, and in many cases can be less than 0.1 ohm, and is also changing depending on line conditions. Thus, the shunt current regulation method is inefficient and limited in its ability to drive sufficient current into the low line impedances to regulate the voltage over a wide range, and in some cases, with a very low line impedance cannot generate or absorb sufficient current to correct to the required voltage. The series voltage regulation method is highly efficient, does not need an internal storage device such as an unreliable high voltage electrolytic capacitor necessary for the shunt configuration, and can regulate the AC output voltage over a very wide range of input AC voltages, is independent of line impedances, and can be operated independently as a standalone AC series voltage regulation AVR.

Figure 4:
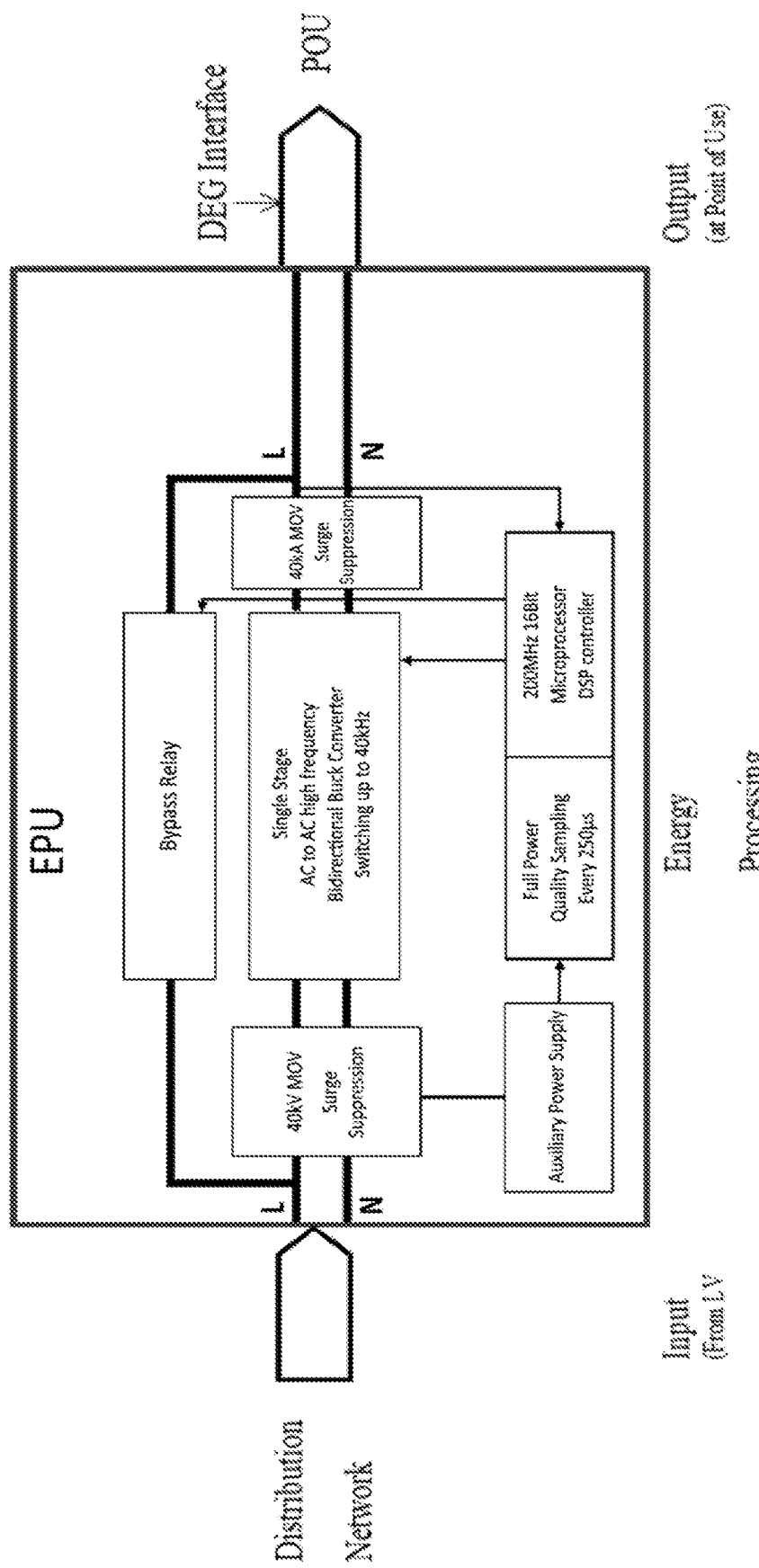
FIG. 4 schematically depicts an exemplary EPU.
Figure 5:
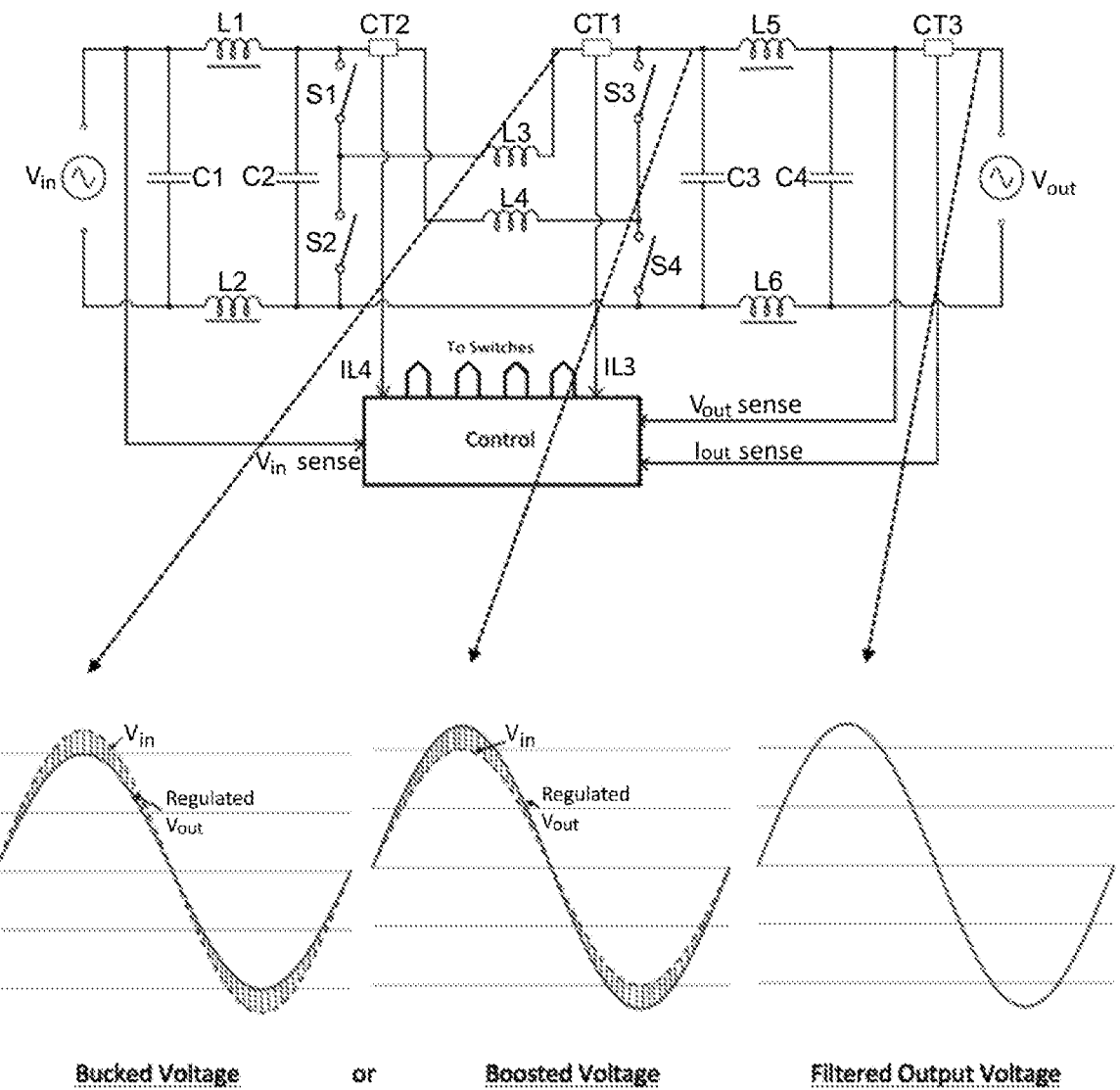
FIG. 5 depicts a circuit diagram for tan AC-AC converter of an exemplary EPU.

An exemplary EPU is schematically depicted in FIG. 4. The circuit diagram for the AC-AC converter portion of the exemplary EPU is depicted in FIG. 5. FIG. 4 shows the basic operating principles of the series voltage regulator defined in U.S. Patent Application No. 61/896,639 and U.S. Patent Application No. 61/913,935 as a complete full AVR HF AC series voltage regulator that can buck or boost the AC input voltage at each HF point. For example, if the operating frequency of the AVR HF AC voltage regulator is configured to be 25 kHz, then the input voltage is sensed by the electronic analogue or mix of digital and analogue circuitry and compared to a voltage reference, and then the AC bidirectional semiconductor switches S1, S2, S3, and S4 in combination with the power inductors L3 and L4 are driven under PWM control to buck (reduce) or boost (increase) the AC input voltage at the AVR HF AC series voltage regulator output. The voltage is adjusted at each 40 microsecond interval point through each LF mains voltage cycle, typically, but not limited to, 50 Hz or 60 Hz. Therefore, under an analogue or digital electronic PWM control with reference to a fixed reference voltage level, the full AVR HF AC series voltage regulator is able to fully regulate the AC output voltage to the desired set level. FIG. 5 also shows the waveforms of the HF PWM bucking or boosting the input AC voltage at the AVR HF AC series voltage regulator output, and the input filter components C1, C2, L1, and L2 in combination are used to eliminate the HF switching energy from passing back into the input AC source; and the output filter components C3, C4, L5, and L6 in combination are used to eliminate the output HF PWM switching pulses and to average the HF voltage PWM ripple to an average DC level, creating a smooth regulated AC output voltage.

The circuitries and description thereof disclosed herein are simplified for clarity and various other circuit configurations and devices can be used in applying the principles of the series voltage regulator defined in U.S. Patent Application No. 61/896,639 and U.S. Patent Application No. 61/913,935. For instance, the bidirectional AC switches are semiconductor devices and can comprise of various circuit configurations, but these switches are still acting as AC bidirectional semiconductor switches as used commonly in the industry. Such bidirectional AC semiconductor switches, for example, but not limited to, can be a rectifier bridge comprising of four rectifiers with a unipolar semiconductor device configuration inserted in the bridge such as SCR, GTO, IGBT, MOSFET, or any other semiconductor device used for the same effect with PWM drive control that can create a controlled bidirectional AC semiconductor switch device. Also, other semiconductor AC switch configurations and devices used in the industry with or without rectifiers such as back-to-back or anti-parallel-SCR's, GTO, IGBT, RB-IGBT, MOSFET, any other back-to-back or anti-parallel bidirectional AC semiconductor devices or configurations, or any other similar new semiconductor devices in the future, such as, but not limited to, GaN, SiC are some of the alternative embodiments of the series voltage regulator defined in U.S. Patent Application No. 61/896,639 and U.S. Patent Application No. 61/913,935.

Although only single phase electrical systems are described herein, the principles of the series voltage regulator defined in U.S. Patent Application No. 61/896,639 and U.S. Patent Application No. 61/913,935 can be applied to other AC frequency and poly-phase AC systems, for example, common 3-phase electrical systems, by utilizing and interconnecting a number of the HF AC series buck topology, HF series boost topology, or combined AVR HF series buck-boost topology for full HF AC AVR automatic voltage control sections or units to create poly-phase voltage regulators. Since these HF series voltage sections can be independently controlled, they can also be designed for voltage balancing configurations to rebalance out of balance poly-phase voltages.

The AVR HF buck-boost AC series voltage regulator shown in FIG. 5 utilizes the HF (e.g. 1 KHz-1,000 KHz) power inductor L3 in combination with the AC bidirectional semiconductor switches S1 and S2 to bucks the AC input voltage, and HF power inductor L4 in combination with the AC bidirectional semiconductor switches S3 and S4 to boosts the AC input voltage. The AC bidirectional semiconductor switches, S1, S2, S3, and S4, are driven individually by PWM outputs from the electronic control circuit to create an AVR automatic voltage control topology that can decrease (buck) or increase (boost) the input AC voltage to regulate the AC output voltage to a set desired level. This design is power-flow bidirectional, direct single stage, and has no internal DC link capacitor, which is typically an unreliable electrolytic capacitor.

In other embodiments, the buck topology and the boost topology can operate separately. Along with the combined AVR HF buck-boost AC series voltage regulator topology shown in FIG. 4, any one of these topologies needs only to process a portion of the total output power depending on the level of AC input voltage range and variation.

At each HF PWM interval, for example 40 microsecond PWM intervals at 25 kHz, the input voltage in bucked (reduced) or boosted (increased) under HF switch PWM control that generates the correct PWM drive signal to the bidirectional AC semiconductor switches at each HF point on the mains low frequency, typically 50 or 60 Hz, to buck or boost and correct the output AC voltage level to a desired set output AC voltage reference fed to the control electronics.

Other embodiments include various filter configurations that can create the desired effect as described above, with an input filter configuration to eliminate the high frequency switching pulses from entering the input AC mains source, and an output filter configuration eliminating the high frequency switching pulses from the output AC voltage. Still other embodiments include an AC output voltage feedback loop and control electronics to regulate the output voltage to meet the AC output voltage specification of a root-mean-square (RMS), the preferred embodiment, an average voltage, or peak voltage levels of the AC output voltage.

Also, the AVR HF AC series buck-boost AC voltage regulator, and the independent buck or boost sections if used separately, only have to process the differential power across the buck and boost inductors, L3 and L4 respectively, to regulate the varying input AC voltage to a fixed and regulated output AC voltage; thus, this is much less power than the total output power because of the configuration. The buck and boost inductors, L3 and L4 respectively only have to handle the proportion of the total output power required to adjust the differential input AC voltages to regulate the output AC voltage to the desired set level.

Using the wide range AC-AC series voltage regulator/ EPU (for example, the EPU of FIG. 4) installed at each individual POL, each EPU can be remotely controlled to accurately change the EPU output voltage directly at the POL, regardless of the voltage on the network. Thus, for example, the grid voltage may be set to 250V while the EPU may regulate a POL such as an individual house to operate at 220V with a resulting KWH savings to the consumer. The EPU also monitors and transmits, in real time, full power quality data so energy (KWH), power (KW), and reactive power (KVAR) to a remote monitoring and control center, hence peak demand can be calculated at each voltage point. This allows a significant controlled increase in the energy, power, and peak demand savings through the wide range AC-AC series voltage regulation DVR compared to the general average CVR savings across a distribution network. This is because the utility has legislated limits of the allowed voltages, and well known and generally noted as a nominal voltage plus a range of allowed high and low tolerances. For example, Australia has a nominal LV voltage of 230 VAC RMS, −6%, +10%, for a range of allowed minimum of 216 VAC to a maximum 253 VAC. The USA has a nominal LV voltage typically 120 VAC −5%, +5%, for a range of allowed minimum of 114 VAC to a maximum of 126 VAC. The utility, in decreasing its LV grid voltages for energy, power, and peak demand savings, can only, in general, decrease the voltage to an approximate average of the minimum-maximum of the legislated allowed voltages, described above. With the wide-range EPU's installed across the utility grid network, and each EPU output voltage direct at each individual facility or POL, the EPU output voltage can be accurately set and regulated at the minimum allowed legislated voltage regardless of the higher network voltages, therefore the voltage decrease or delta-voltage decrease is larger than the approximate average CVR voltage decrease by the utility, with the corresponding significant increase for the DVR method in the energy, power, and peak demand savings.

In the present invention, variable duty-cycle voltage modulation is used to derive a granular and independent DVR factor at each POL, rather than the more general approximate utility-derived CVR factor. In addition, this new method not only allows individual DVR factors to be derived at each POL, but as the number of EPUs are increased to enhance overall energy and peak demand savings, an increasing sample size with the number of installed EPU's will increase the wide range of data and knowledge of the granular behavior of the individual and collective DVR's, to optimize maximum energy (KWH), power (KW), and reactive power (KVAR), hence peak demand savings. Further, this new method is invisible to the consumer experience by carefully modulating these changing voltages, thus the power savings are realized without affecting the end-user.

In addition, since each DVR factor is calculated for each individual POL, the EPU is designed, depending upon the energy pattern of usage and the particular load characteristics, to optimize the energy (KWH), power (KW), and reactive power (KVAR), hence peak demand savings, for each individual POL load.

Due to the inventive method of variable duty cycle voltage modulation, DVR factors can also be generated at different voltage levels. Current electrical products, in particular residential appliances, are designed generally for minimum cost and, hence, are optimized around the nominal mains LV voltages delivered to the home. Thus, products such as motors, low cost lighting, and even very common switching power supplies can have different DVR factors at low, nominal, or high voltages. With this new method of variable duty-cycle voltage modulation, DVR factors can be determined at these different voltage levels, and can also be used to optimize individual POL loads with each installed EPU.

This new method of variable duty-cycle voltage modulation controls the EPU at each POL to increase and decrease the EPU-regulated output voltage under specific controlled conditions, with monitoring and transmitting the resultant full-power quality data in real time at each voltage point. This variable duty cycle voltage modulation can be done autonomously or remotely. The EPU is designed with full flexibility so that the output voltage modulation can be any waveform shape or speed of ramping. However, the selected modulation speed of voltage change must not cause lighting flicker, which can be very irritating to the consumer, or any visible noise or obvious malfunction of the electrical devices connected to the LV supply. As a result, the inventive method is specifically designed to make the controlled voltage changes invisible to the customer experience. For example, each voltage ramp, that is, either voltage increasing or decreasing, occurs at a maximum slew rate of 1 volt/second.

An example of a voltage modulation according to the present invention is shown in FIG. 1. FIG. 1 depicts an example of a load POL voltage modulation as trapezoidal with 1 volt/second slew rate of increasing and decreasing ramp slopes with a 20 VAC voltage change applied in a variable duty cycle. This type of voltage modulation will be not affect the consumer because the change in voltage is sufficiently slow so as not to cause problems with appliances or light flicker.

Figure 2:
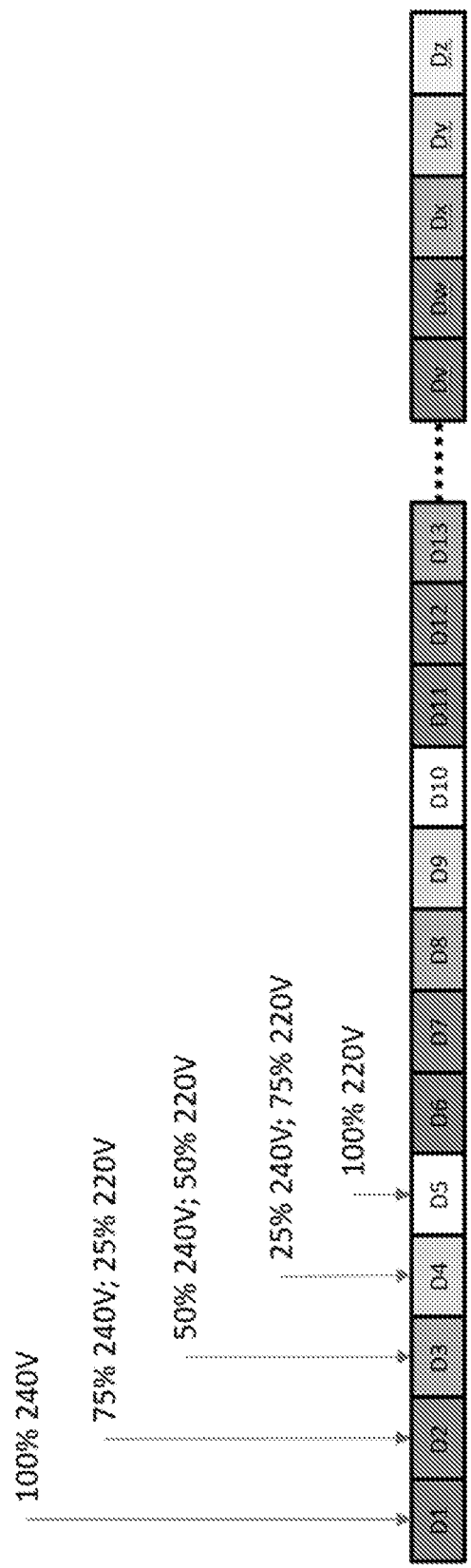
FIG. 2 depicts an example of the variable duty cycle voltage modulation over a 5-day cycle.
Figure 3:
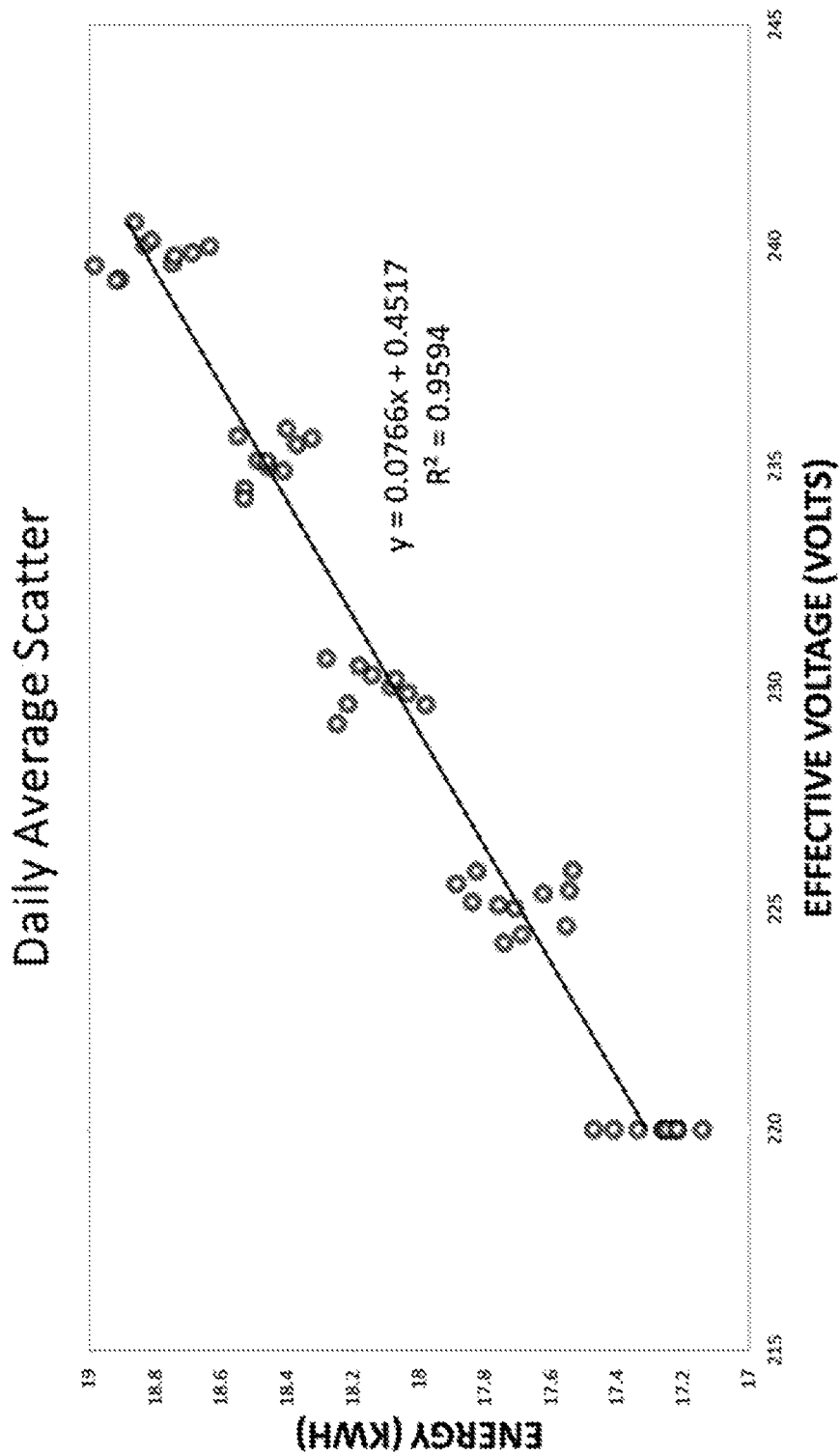
FIG. 3 shows an example a derived linear regression of a 5-statistical mathematical cluster.

In addition, the EPU output voltage modulation can be applied in variable duty cycles in this new method of DVR calculation, that is, deriving the change in energy over the change in voltage that allows the average total energy to be quantified through the selected period. As an illustrative approach to this new variable duty-cycle voltage modulation method, the period may be set to one hour, and over a set 5-day cycle the duty cycle is varied from 100% for the first day, to 75% for the second day, to 50% for the third day, to 25% for the fourth day, to 0% for the fifth day, and this example of a 5-day cycle is repeated continuously. This cycle is depicted in FIG. 2. Variable duty-cycle voltage modulation in this example generates five mathematical statistical clusters that can be compared over a linear regression instead of just two statistical clusters if a simple on-off method is used, such as switching between one high and one low voltage. The results are depicted in the linear regression of the mathematical clusters in FIG. 3, with voltages set to 240V, 235V, 230V, 225V, and 220V. Various patterns using this new method of variable duty-cycle voltage modulation of different duty cycles, over different cycle periods, may be selected in the inventive variable duty-cycle voltage modulation method. Further, with the method of variable duty-cycle voltage modulation, various relevant mathematical derivations and different approaches, may be used without impacting the fundamental inventive disclosure of this invention of using an EPU for variable duty-cycle voltage modulation to derive DVR factors at individual POL's for energy (KWH), power (KW), and reactive power (KVAR), hence peak demand savings.

In this example, voltage modulation from 220V to 240V over the five-day cycle is performed with a 25% duty-cycle increment. The DVR is the representation in percent reduction in energy or KWH over the percent reduction in voltage, in the equation below. Using the same example of the linear regression five-data cluster, the resultant slope (m) and y-intercept (b) can be substituted to the equation of energy savings; extrapolating the energy at high voltage (e.g., 240V) and the energy at low voltage (e.g., 220V) using the best fit curve and quantifying the difference between the high energy and the low energy to account for the energy savings.

$$DVR = \frac{\text{Energy Savings}}{\text{Voltage Reduction}}$$

$$\text{Voltage Reduction} = \frac{V_{240V} - V_{220V}}{V_{240V}}$$

From Linear Regression example:

$$\text{Energy Savings} = 1 - \frac{m * V_{220V} + b}{m * V_{240V} + b}$$

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

The invention claimed is:

1. A method of determining one or more direct voltage reduction (DVR) factors at a point of load (POL) in a power grid voltage environment comprising:
   installing an energy processing unit (EPU) at each individual POL, each EPU comprising at least one AC-AC series voltage regulator;
   increasing and decreasing an EPU-regulated output voltage under specific controlled conditions; and
   deriving one or more independent DVR factors for each individual POL during the increased and decreased EPU-regulated output voltage.

2. The method of claim 1, further comprising optimizing the DVR factor derived by each EPU, based on an energy usage pattern and one or more loads characteristics.

3. The method of claim 2, wherein the optimizing is performed autonomously or remotely by a controller.

4. The method of claim 1, wherein the DVR factor is derived at each of a plurality of voltage levels.

5. The method of claim 1, wherein the increasing and decreasing of the EPU regulated output voltage is performed by a variable duty cycle voltage modulation comprising:
   generating a number of mathematical statistical clusters; and
   comparing said number of mathematical statistical clusters over a linear regression to determine a DVR factor.

6. The method of claim 1, wherein the increasing and decreasing of the EPU regulated output voltage occurs at a maximum slew rate of 1 volt/second.

7. The method of claim 1, further comprising using the DVR factor to determine a voltage level for an EPU.

8. The method according to claim 1, wherein the regulated output voltage is modulated in a trapezoidal waveform with 1 volt/second slew rate of increasing and decreasing ramp slopes.

9. The method according to claim 1, where plural DVR factors are determined for increased energy (KWH), power (KW), and reactive power (KVAR).

10. The method according to claim 1, further comprising increasing and decreasing an EPU-regulated output voltage under specific controlled conditions for a plurality of EPUs installed at a plurality of POLs, and deriving DVR factors based on the plurality of EPUs.

* * * * *